(12) United States Patent
Petit et al.

(10) Patent No.: US 6,169,138 B1
(45) Date of Patent: Jan. 2, 2001

(54) FOAMED PRESSURE SENSITIVE TAPES

(75) Inventors: Dominique Petit, Housse; Michel Ladang, Herve, both of (BE)

(73) Assignee: Saint-Gobain Performance Plastics Corporation, Wayne, NJ (US)

( * ) Notice: Under 35 U.S.C. 154(b), the term of this patent shall be extended for 0 days.

(21) Appl. No.: 09/091,133

(22) PCT Filed: Jun. 10, 1996

(86) PCT No.: PCT/US96/10107

§ 371 Date: Jun. 4, 1998

§ 102(e) Date: Jun. 4, 1998

(87) PCT Pub. No.: WO97/47681

PCT Pub. Date: Dec. 18, 1997

Related U.S. Application Data

(63) Continuation-in-part of application No. 08/877,060, filed on Jun. 17, 1997, now Pat. No. 5,780,523, which is a continuation of application No. 08/356,100, filed on Dec. 15, 1994, now abandoned.

(51) Int. Cl.[7] .............................. C08J 57/02; C08L 77/00; B32B 33/00

(52) U.S. Cl. .............. 524/500; 428/40.1; 428/40.2; 428/40.3; 428/42.1; 428/308; 428/325; 428/327; 428/338; 428/339; 428/343; 428/352; 428/354; 428/355; 428/406; 428/407; 428/441; 428/500; 521/139; 521/140; 524/502; 524/505

(58) Field of Search ........................... 428/40.1, 40.2, 428/308, 325, 327, 338, 339, 343, 352, 354, 355, 406, 441, 500, 407, 40.4, 41.3, 42.1; 521/139, 140; 524/500, 502, 505

(56) References Cited

U.S. PATENT DOCUMENTS

| | | | |
|---|---|---|---|
| 3,615,972 | 10/1971 | Morehouse, Jr. et al. | 156/79 |
| 4,223,067 | 9/1980 | Levens | 428/308 |
| 4,430,479 | 2/1984 | Merton et al. | 525/127 |
| 4,483,889 | 11/1984 | Andersson | 427/389.9 |
| 4,731,066 | 3/1988 | Korpman | 604/366 |
| 4,855,169 | 8/1989 | McGlothlin et al. | 428/35.2 |
| 4,855,170 | 8/1989 | Darvell et al. | 428/40 |
| 5,024,880 | 6/1991 | Veasley et al. | 428/317.5 |
| 5,180,635 | 1/1993 | Plamthottam et al. | 428/345 |
| 5,244,996 | 9/1993 | Kawasaki et al. | 526/347 |
| 5,272,208 | 12/1993 | Shiraki et al. | 525/92 |
| 5,342,858 | 8/1994 | Litcholt et al. | 521/98 |
| 5,455,111 | * 10/1995 | Velasquez Urey | 428/315.5 |
| 5,475,075 | 12/1995 | Brant et al. | 526/348.3 |
| 5,681,654 | * 10/1997 | Mamish et al. | 428/354 |
| 5,780,523 | * 7/1998 | Petit et al. | 521/137 |
| 5,869,555 | * 2/1999 | Simmons et al. | 524/229 |

FOREIGN PATENT DOCUMENTS

| | | | |
|---|---|---|---|
| 84220 | 7/1983 | (EP) | C09J 7/00 |
| 349216 | 1/1990 | (EP) | C09J 7/02 |
| 2237945 | 7/1974 | (FR) | C09J 3/16 |
| 2250513 | 6/1992 | (GB) | C09J 7/00 |
| 57-137375 | 8/1982 | (JP) | C09J 7/02 |
| 59-155479 | 9/1984 | (JP) | C08K 5/00 |
| 63-202680 | 8/1988 | (JP) | C09J 3/14 |
| 1313581 | 12/1989 | (JP) | C09J 7/02 |
| 7070520 | 3/1995 | (JP) | C09J 7/00 |
| 94/13459 | 6/1994 | (WO) | B29C 67/22 |
| 95/25774 | 9/1995 | (WO) | C09J 5/08 |

OTHER PUBLICATIONS

120: 325387W Peelable pressure–sensitive adhesives, Chemical Abstracts vol. 120, 1994, p. 86.

* cited by examiner

Primary Examiner—Samuel A. Acquah
(74) Attorney, Agent, or Firm—Mary E. Porter

(57) ABSTRACT

The present invention relates to a pressure sensitive adhesive foam with a percentage of theoretical density less than 90, wherein the foam has a peel adhesion of greater than about 1 N/cm and a compression set under constant deflection of less than about 60%. The present invention further includes a pressure sensitive adhesive foam comprising a thermoplastic block copolymer, a tackifying resin; an isocyanate terminated monomer or oligomer; a polymer comprising a backbone selected from the group consisting of polybutadiene, polyester and polyether, wherein the polymer contains at least 2 active hydrogens capable of reacting with the isocyanate terminated monomer; and expandable particulate materials. The present invention further includes a pressure sensitive adhesive foam comprising a thermoplastic olefin polymer or copolymer, having a density less than 0.91 g/cm$^3$ and a torsion modulus less than 18 MPa, and a tackifying resin; and, optionally, plasticizing oil and expandable particulate materials, or glass microspheres. The invention finally further comprises a method of forming the above film.

19 Claims, No Drawings

FOAMED PRESSURE SENSITIVE TAPES

This application is a continuation-in-part of U.S. Ser. No. 08/877,060, filed Jun. 17, 1997, now U.S. Pat. No. 5,780,523, which is a continuation of now abandoned U.S. Ser. No. 08/356,100, filed Dec. 15, 1994.

BACKGROUND OF THE INVENTION

1. Field of the Invention

The invention relates to pressure sensitive adhesive foams and in particular to pressure sensitive adhesive foams which are easily compressed and conform to irregular surfaces. The invention further relates to a method of processing these pressure sensitive adhesive foams.

2. Technology Review

Pressure sensitive adhesives (PSA) that can be extruded are well known. Examples of pressure sensitive adhesives include rubbers mixed with the proper tackifying resins, cured acrylics, and interpenetrating polymer networks containing blocked copolymers in a polyurethane network.

These pressure sensitive adhesives (PSA) all suffer from the common limitation of being relatively hard to compress. The pressure sensitive adhesives therefore do not conform easily to irregular surfaces, a property that is vital to ensure 100% wetting and therefore good adhesion.

Generally, a limitation such as this could be overcome by making a composition cellular or foamed. Foams are pliable, conform easily to irregular surfaces and can be produced by either physical (e.g., frothing with nitrogen before the polymeric mass sets) or chemical (incorporation of a porophoric agent such as azodicarbonamide which undergoes a chemical decomposition under heat to produce gaseous bubbles) means. Pressure sensitive adhesive foams produced by either of the above techniques, however, suffer from another limitation. Because of their inherent tack, these pressure sensitive adhesive foams when compressed tend to irreversibly deform due to adherence between opposite sides of the cells in the cellular structure.

Presently, because of this limitation adhesive foams are produced by coating non-adhesive foam substrates with thin layers of pressure sensitive adhesives. These products both conform to irregular surfaces and are pressure sensitive thereby overcoming the limitations of solid pressure sensitive adhesive extrusions and pressure sensitive adhesive foams. These products are, however, relatively complicated to produce and cannot be used for extruded profiles. Furthermore, these products show relatively poor adherence to non-polar plastic surfaces.

The foams of the invention are characterized by superior adherence to non-polar plastic surfaces, compared to the acrylic adhesive coated foams of the art. Unlike the foams of the art, the foams of the invention have acceptable peel test values from difficult to adhere non-polar plastic surfaces, including decorative trim pieces made of polypropylene and used on products such as automotive bodies and other vehicle surfaces, manufactured appliances, and home and office furnishings and equipment.

The foams of this invention are inherently adhesive foam products which reversibly deform upon compression. This invention also describes a process for producing the above inherently adhesive foamed product, preferably utilizing expandable particulate materials, or, in some instances, glass spheres, to prevent interior foam collapse and adhesion.

SUMMARY OF THE INVENTION

The present invention relates to a pressure sensitive adhesive foam with a percentage of theoretical density less than 90 wherein the foam has a peel adhesion of greater than about 1 N/cm and a compression set under constant deflection of less than about 60 percent. The present invention further includes a pressure sensitive adhesive foam comprising a thermoplastic block copolymer; a tackifying resin; an isocyanate; a polymer comprising a backbone of selected from the group consisting of polybutadiene, polyester and polyether, wherein the polymer contains at least 2 active hydrogens capable of reacting with the isocyanate; and expandable particulate materials.

The present invention further includes a pressure sensitive adhesive foam comprising a thermoplastic olefinic polymer or copolymer, having a density less than 0.91 g/cm3 and a torsion modulus less than 18 MPa, and a tackifying resin; expandable particulate materials, or glass microspheres; and, optionally, plasticizing oil.

The invention finally further comprises a method of forming the above foam.

DETAILED DESCRIPTION OF THE INVENTION

The present invention relates to a pressure sensitive adhesive foam having a density that is less than 90% of the theoretical density, wherein the foam has a peel adhesion of greater than about 1 N/cm and a compression set under constant deflection of less than about 60 percent.

The foam has a percentage of theoretical density less than 90, preferably less than about 70 percent, more preferably less than about 50 percent, and most preferably less than about 40 percent. The material from which the foam is made has a density that is the "theoretical density". The foam formed from this material has a reduced density and the extent of the reduction is indicated by the percentage of the theoretical density represented by the density of the blown foam material.

The foam has a peel adhesion of greater than about 1 N/cm, preferably greater than about 5, more preferably greater than about 10, and most preferably greater than about 20 N/cm. As used herein, "peel adhesion" is the adhesive strength of the foam expressed as the force needed to remove the foam from a prescribed surface as measured by ASTM D903 method.

The meaning of compression set for purposes of this specification is compression set under constant deflection which is the recovery of a foam after a constant deflection. ASTM Standard D 1667-76, paragraphs 21 to 25, which are incorporated herein by reference describes the test method for determining compression set with the following modification. As noted in the Examples 1 and 2, below, certain specimens were compressed to 50% of their original thicknesses, rather than to 25% of their original thicknesses as specified in the test method.

The foam has a compression set of less than about 60 percent, preferably less than about 40 percent, more preferably less than about 20 percent, and most preferably less than about 10 percent.

The foam is produced by first mixing a pressure sensitive adhesive composition with expandable particulate materials. The mixture may be coated onto a substrate (e.g., a release film), or extruded (e.g., with screw extruder or high pressure pump) into a sheet or film through a flat die or into other geometries, such as a round or semi-circle bead, through a rounded die or otherwise formed to a desired shape by molding or other means known in the art for shaping plastic materials. The viscosity of the mixture may be adjusted depending on whether the mixture is coated, extruded or formed into a shape. The mixture can either be heated just prior to, during or after coating, extrusion or forming to a temperature at which substantially all of the expandable particulate material expands. The foam can subsequently be cured if necessary.

When utilizing polyolefinic polymers as the elastomers in the adhesive formulation, the foam may be produced as described above, or it may be foamed by traditional chemical blowing techniques, with or without the addition of glass microspheres or the expandable particulate material, or by physical foaming techniques, with or without the addition of glass microspheres or the expandable particulate material, or by a combination of techniques and materials.

The pressure sensitive adhesives which may be used include adhesives which are compounded to be pressure sensitive by blending an elastomer with tackifying resins, plasticizers and other ingredients, and adhesives which consist of polymers that are inherently pressure sensitive and require little or no compounding. Examples of elastomers which are blended with tackifying resins include natural rubber; and block copolymer adhesives such as for example polystyrene-polybutadiene-polystyrene (SBS), polystyrene-polyisoprene-polystyrene (SIS), polystyrene-poly(ethylene/butylene)-polystyrene (S-EB-S), and polystyrene-poly(ethylene/propylene)-polystyrene (S-EP-S). Examples of inherently adhesive polymers which can be used with or without tackifiers to create foams include acrylics; butyl rubber; polyisobutylene; and silicones.

Certain low density, olefinic elastomers, including polymers and copolymers having a density of less than 0.91 g/cm3 and a torsion modulus of less than 18 MPa (i.e., "soft olefins", having a torsion modulus measured as described in Example 3, below), are suitable for use herein in combination with tackifying resins. Olefins having a density of less than 0.875 g/cm3 and a torsion modulus of less than 3.7 Mpa are preferred. Suitable olefins include those described in U.S. Pat. No. 5,475,075 to Brant et al., which is hereby incorporated by reference. The Brant olefins are polymerized using a cyclopentadienyl metallocene catalyst system ("metallocene polymers") and include a range of densities from 0.85–0.95 g/cm3. Only those metallocene polymers having a density of less than 0.91 g/cm3 which also are soft polymers may be used herein.

As used herein, "metallocenes" refers to polymerization catalyst systems such as the system disclosed in U.S. Pat. No. 5,191,052, hereby incorporated by reference. Metallocenes are complex combinations of a metal atom compound with cyclopentadienyl groups (Cp). The metallocenes are a "sandwich complex" arrangement of two Cp groups and a Group IV Transition Metal (Ti, Zr, Hf, Cr). Such catalysts are also named "single site" or "constrained geometry" catalysts. The metallocenes differ significantly in structure and reactivity from the conventional Ziegler-Natta catalysts used in the conventional polymerization of ethylene polymers and copolymers. The metallocenes typically yield low bulk density in contrast to conventional catalysts for ethylenic polymers.

The metallocene catalysts are single site catalysts and they control the orientation of each monomeric unit added to the polymeric chain. The olefinic polymers produced with these catalysts have a uniform -compositional distribution and all polymer molecules within such materials have substantially similar compositions. Some copolymers prepared with metallocene catalysts contain long-chain branches within the ethylene backbone of the molecules. In contrast, conventional linear low density polyethylene typically does not contain long chain branches. Conventional ethylenic polymers have a wide compositional distribution and differ significantly in physical and mechanical properties, such as crystallinity, from metallocene polymers having substantially equivalent molar compositions and average molecular weights. For example, the metallocene polymers useful in the pressure sensitive adhesives of the invention are amorphous thermoplastic materials, having a much lower crystallinity than conventional linear low density polyethylene.

Suitable olefins in addition to metallocene polymers, include, but are not limited to homopolymers and copolymers of ethylene, propylene, butene and methylpentene, having the density and softness characteristics specified above, whether or not polymerized using a metallocene catalyst system. Copolymers of ethylene are preferred, especially alpha-olefinic copolymers.

In forming an elastomer based pressure sensitive foam, the elastomer or rubbery polymer provides the elastic component while a low molecular weight tackifying resin constitutes the viscous component. Therefore, for these elastomer systems, it is the tackifying resin which ultimately determines the viscoelastic behavior and the final properties of the finished adhesive. Further, tackifier resins can also be used in inherently adhesive polymers to increase the adhesion. Examples of tackifying resins which can be used include rosins and rosin derivatives; and hydrocarbon tackifier resins which further include aromatic, aliphatic, mixed aliphatic/aromatic, heat-reactive, terpene resins and modified or special resins.

Additives can be added to vary the properties and aging of the pressure sensitive adhesive foam. Examples of additives which can be used include antiblocking agents, antioxidants, antistatic agents, biocides, colorants, couplings agents, curing agents, flame retardants, heat stabilizers, low profile additives, lubricants, mold-release agents, odorants, plasticizers, slip agents, ultraviolet stabilizers, urethane catalysts, viscosity control agents and combinations thereof.

The expandable particulate material useful in the present invention can be swellable or non-swellable in aqueous or organic liquid, and preferably is insoluble in water or organic liquids. The expandable particulate comprises a polymeric shell having a central core comprised of a fluid, preferably liquid, material. A further requirement is that the overall dimensions of the expandable particulate increase upon heating at a specific temperature.

Expandable particulates include those materials comprised of a polymeric shell and a core of at least one other material, either liquid or gaseous, most preferably a liquid at room temperature. A liquid core is advantageous because the degree of expansion is directly related to the volume of change of the core material at the expansion temperature. For a gaseous core material, the volume of expansion expected can be approximated from the general gas laws. However, expandable particulates comprising liquid core material offer the opportunity to provide much larger volume changes, especially in those cases where a phase change takes place, i.e., the liquid volatilizes at or near the expansion temperature. Gaseous core materials include air and nonreactive gases, and liquid core materials include organic or inorganic liquids. The expansion function can also be supplemented by the addition of other conventional blowing agents.

The preferred expandable particulate materials have shells surrounding a fluid material. Examples of shell materials include copolymers of vinyl chloride and vinylidene chloride, copolymers of vinyl chloride and acrylonitrile, copolymers of vinylidene chloride and acrylonitrile, and copolymers of styrene and acrylonitrile. Further can be mentioned copolymers of methyl methacrylate containing up to about 20 percent by weight of styrene, copolymers of methyl methacrylate and up to about 50 percent by weight of ethyl methacrylate, and copolymers of methyl methacrylate and up to about 70 percent by weight of orthochlorostyrene.

The unexpanded microspheres contain fluid, preferably volatile liquid, i.e., a blowing agent, which is conventional for these expandable particles. Preferably, the blowing agent is 5 to 30 percent by weight of the expanded particle. The microspheres can be added in different manners, as dried particles, wet cakes, or in a suspension. The microspheres can also be added in a pre-expanded form.

The unexpanded particulates preferably are in the size range of from about 1 to about 100 um, more preferably from about 2 to about 30 um, and most preferably from 2 to about 10 um. After expansion, the volume of expandable particulate increases by a factor of at least 2, preferably by a factor of at least 3, and most preferably by a factor of at least 4, and may even be is high as a factor of about 10.

An example of an expandable particulate material is Expancel® polymeric microspheres (Nobel Industries, Sundsvall, Sweden) which expand from an approximate diameter of 10 um in the unexpanded form to an approximate diameter of 40 um after expansion. The corresponding volume increase is:

$$V_f/V_i = (r_f/r_i)^3 = 4^3$$

or 64 fold, where $V_f$ and $r_f$ are the final volume and radius of the expandable particulate, respectively, after expansion, and $V_i$ and $r_i$ are the corresponding initial values for the unexpanded particulate.

The expandable particulate is normally obtained by suspension polymerization. A general description of some of the techniques that can be employed and a detailed description of various compositions that are useful as expandable particulates can be found in U.S. Pat. No. 3,615,972. A further description of compositions useful as expandable particulate can be found in U.S. Pat. No. 4,483,889. Both patents are herein incorporated by reference.

Examples of commercially available expandable particulate materials useful in the present invention include those made of poly(vinylidene chloride-co-acrylonitrile) such as Expancel® 820, Expancel® 642, Expancel® 551, Expancel® 461, and Expancel® 051 expandable particulate. Other commercially available materials having similar constructions are available. For example, one comprising a shell of methacrylonitrile-acrylonitrile copolymer, available as Micropearl® F-80K microbubbles (Matsumoto Yushi-Seiyaku Co., Ltd., Japan) are also useful as expandable particulate materials in the present invention.

A wide variety of blowing or raising agents may be incorporated within the foaming process of the present invention. These agents can be volatile fluid forming agents such as aliphatic hydrocarbons including ethane, ethylene, propane, propene, butene, isobutene, butane and isomers, cyclobutane, pentane and isomers, cyclopentane, hexane and isomers, cyclohexane, neopentane, acetylene, heptane, or mixtures thereof or other such aliphatic hydrocarbons having a molecular weight of at least 26 and a boiling point below the range of the softening point of the shell.

Other suitable blowing agents are halocarbons such as perfluorobutanes, perfluoropentanes, perfluorohexanes, fluorotrichloromethane, dichlorodifluoromethane, chlorotrifluoromethane, trichlorotrifluoroethane, heptafluorochlorocyclobutane, hexafluorodichlorocyclobutane, and hydrohalocarbons such as $CHF_3$, $CHClF_2$, $CH_3CHF_2$, and tetralkyl silanes such as tetramethyl silane, trimethylethyl silane, trimethylisopropyl silane, and trimethyl-n-propyl silane all of which are commercially available.

The shape of the expandable particulate material is preferably spherical but is not restricted to being spherical, i.e., it may be irregular. Other shapes can easily be envisioned such as urnlike as described in U.S. Pat. No. 3,615,972. The shape and orientation of the expandable particulate in the pressure sensitive adhesive help to determine the anisotropy of the expansion step. Where essentially spherical expandable particles are used, heating leads to isotropic expansion of the article, i.e., there is no preferred direction of expansion and all three axes expand uniformly so that the overall shape of the article does not change, only its size. Other physical constraints that may have been imposed on the article prior to expansion may lead to less than perfect isotropic expansion where essentially spherical expandable particles are used.

As a result of the expansion of the expandable particulate material, the volume of the pressure sensitive material increases. The percent volume increase is dependent on a number of factors including factors such as the amount of expandable particulate material in the article and the molecular weight of the polymeric shell of the particles. The decrease in density of the article is inversely proportional to the volume and porosity increase in the article.

A preferred embodiment of the present invention is a pressure sensitive adhesive foam comprising an olefinic polymer or copolymer having a density of less than 0.91 g/cm3 and a torsion modulus of less than 18 Mpa, a tackifying resin, and expandable particulate materials. A tackifying system including the tackifying resin and a plasticizing oil is preferably used.

The olefinic polymer or copolymer preferably comprises from about 5 to about 80 percent by weight of the total composition of the pressure sensitive adhesive components, (i.e., all components except the expandable particulate materials), more preferably from about 10 to about 50 percent by weight, and most preferably from about 20 to about 35 percent by weight.

Another preferred embodiment of the present invention is a pressure sensitive adhesive foam comprising a thermoplastic block copolymer; a tackifying resin; an isocyanate; a polymer comprising a backbone selected from the group consisting of polybutadiene, polyester and polyether, wherein the polymer contains at least 2 active hydrogens capable of reacting with the isocyanate; and expandable particulate materials.

The thermoplastic block copolymer or elastomers are non-reactive with all other components in the composition. Examples of suitable copolymers include: styrene-isoprene-styrene block copolymers, styrene-butadiene-styrene block copolymers, ethylene-propylene rubbers, polyethylene-acrylate, styrene-butadiene, styrene-isoprene, styrene-ethylene-butylene-styrene, 10 ethylene-propylene-diene terpolymer rubbers, and ethylene vinyl acetate.) The thermoplastic block copolymer preferably comprises from about 5 to about 80 percent by weight of the total composition of the pressure sensitive adhesive foam comprising components, (that is all components except the expandable particulate materials), more preferably from about 10 to about 50 percent by weight, and most preferably from about 10 to about 35 percent by weight.

The tackifying resin preferably comprises from about 15 to about 80 percent by weight of the total composition of the pressure sensitive adhesive foam, more preferably from about 25 to about 70 percent by weight, and most preferably from about 30 to about 60 percent by weight. Examples of types of tackifier resins which can be used include rosin and rosin derivatives, aromatic hydrocarbon resins, aliphatic hydrocarbon resins, mixed aliphatic/aromatic resins and terpene resins. The tackifier is preferably a hydrocarbon resin. Examples of hydrocarbon tackifier resins include glycerine rosin ester, hydrogenated pentaerythritol ester, hydrogenated glycerine ester, modified tall oil rosin, polymerized rosin and rosin ester.

Various plasticizing oils, which are themselves tackifying materials, may be used in combination with the tackifying resins to increase tack at lower temperatures. The plasticizing oils are preferably used with the tackifying resins in formulations containing the olefinic polymers as the elastomer component of the adhesive. The combination of plasticizing oils and tackifying resins may be used at the same weight percentages as the tackifying resins alone. Adhesive formulations preferably contain about 0.35 to about 30 percent, by weight of the pressure sensitive adhesive components (all components except the expandable particulate materials and/or glass spheres), of plasticizing oil, more preferably about 2 to 20 percent, and most preferably, 5 to 15 percent. Suitable plasticizing oils include, but are not limited to, dewaxed and solvent refined parafinic oils, low molecular weight polybutenes, and other, similar hydrocarbons existing in a predominately liquid state at room temperature, and combinations thereof.

The active-hydrogen containing polymer comprises a backbone selected from the group consisting of diene polymers and copolymers, polyesters, olefin polymers and copolymers, acrylate copolymers, polyethers and mixtures thereof, and contains at least 2 active hydrogens capable of reacting with the isocyanate terminated monomer. The polymer preferably comprises from about 5 to about 70 percent by weight of the total composition of the pressure sensitive adhesive foam, more preferably from about 5 to about 50 percent by weight, and most preferably from about 10 to about 25 percent by weight. Examples of these polymers include polyester diols such as Dynacoll® manufactured by Hüls; Lupranols® manufactured by BASF; polybutadiene-diols such as PolyBD® manufactured by Atochem; polyetheramines such as Jeffamine® manufactured by Texaco; hydroxyl grafted ethylene vinyl acetates such as Evathane® manufactured by Atochem; poly-e-caprolactones such as Capa® manufactured by Solvay; and mixtures thereof.

The isocyanate component can be any one of those typically used in such formulations including tetramethylene diisocyanate, (TMDI); isophorone diisocyanate, (IPDI); methylene diisocyanate, (MDI); toluene diisocyanate, (TDI); polyphenyl polymethyl polyisocyanate, (PPPI); p-diphenyl methane diisocyanate; and the like. The preferred isocyanate is TMDI. The isocyanate is added in amounts to give a ratio of isocyanate groups to active hydrogen-containing groups of from about 0.25 to about 1.75 more preferably from about 0.5 to about 1.5 and most preferably from about 0.75 to 1.25. It is also possible to use components that yield isocyanates under reaction conditions. This includes the so-called "blocked" isocyanates in which the isocyanate group is reacted with a blocking compound such as a phenol or a phenol derivative that protects the isocyanate group from reaction with air or water under ambient conditions but which is stripped off under reaction conditions.

The expandable particulate materials preferably comprise from about 0.5 to about 35 percent by weight of the total composition of the pressure sensitive adhesive foam, more preferably from about 2 to about 25 percent by weight, and most preferably from about 5 to about 20 percent by weight.

The glass microspheres used with the polyole finic polymers preferably comprise from about 0.5 to about 25 percent by weight of the total composition of the pressure sensitive adhesive foam, more preferably from about 2 to about 15 percent by weight, and most preferably from about 5 to about 10 percent by weight. Suitable glass microspheres for use in the invention may be obtained from PQ Hollow Spheres, Ltd., Yorkshire, England, under the Armospheres 150 tradename.

The olefinic polymers may be cross-linked before, during or after following formation of the adhesive foam. Cross-linking may be carried out by chemical means, including but not limited to treatment with peroxides (e.g., Perkadox BC or Perkalink 301 cross-linkers available from Flexsys N.V., Woluwe, Belgium), ionic agents or silanes, or by physical means, including but not limited to electron beam and gamma-ray radiation (Cobalt 60 source). When carried out with the tackifying resins and plasticizing oils described in Examples 3 and 4, below, chemical cross-linking with peroxides improved the temperature resistance, but decreased the peel strength of the adhesive foam. The opposite effect was observed with the same adhesive foams when subjected to physical cross-linking with either electron beam or gamma-ray radiation. One skilled in the art will recognize that the effects of cross-linking adhesive foam compositions will vary depending upon the components in the adhesive and the linking agent selected. Any of a variety of means may be selected by the practitioner for use herein depending upon the properties required of the foam during use.

As an alternative to crosslinking, or in conjunction with crosslinking, an interpentrating polymeric network may be created in the pressure sensitive adhesive formulation containing the olefinic polymers. Suitable networks include, but are not limited to, the isocyanate-reactive diene polymer systems described above for use with acrylic pressure sensitive systems. The network increases the thermal stability of the resultant pressure sensitive adhesive foam.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Example 1

This example is a comparison between non-adhesive foams which are coated with a pressure sensitive adhesive and a intrinsically pressure sensitive adhesive foam.

Preparation of Masterbatch of the Pressure-Sensitive Foam

The masterbatch is made in a Z-blade mixer provided with two counter rotating Z shaped blades that are able to thoroughly mix even viscous elastomers with one another. The mixing space is steam jacketed, and the temperature of the materials mixed can be controlled between 80 and 160° C., by regulating the steam pressure in the mixer jacket.

The temperature in the mixer is held at about 150° C. and the different components are introduced in the following order and weight proportions:

SBS Rubber (Vector 4111), 100 parts

Tackifying Resin (Regalite R101), 200 parts

CaCo$_3$ (Setacarb OG), 9 parts

Parafinic Oil (Enerpar 10), 30 parts

Polyetherdiol (Lupranol 2001), 75 parts

Catalyst (Texacat T30), 5 parts

Plastic Spheres (Expancel DU091), 33 parts

Before introducing the Expancel microspheres, the temperature is lowered to 100° C. After completion of the mixing, the composition is unloaded while hot enough to flow easily, on to thick siliconized paper.

Production of the Foam

Mixing the masterbatch with 8 parts by weight of Vestanat TMDI (the isocyanate) is accomplished using a Brabender type machine, with two counter-rotating arms. The mixing is realized in the narrow space between the arms and the walls of the mixer. A typical amount to mixed was 50 g. Working temperature was 100° C., and speed of the arms 50 RPM. Mixing time is about 1 minute. The mixed product is collected on a siliconized Mylar (PET) film. Another sheet of that film is laid on top of the product, and a film is shaped under a press at 100° C. Thickness of the film is 0.3 mm. This film is then cured and foamed in an oven at 150° C. keeping the Mylar on both sides.

The foam according to the invention thus produced was compared with a commercial PUR foam laminated on both sides with a pressure sensitive adhesive and sold by Norton Plastics Products Corp. under the registered trademark "Normount V-2830". This is identified in the Tables below as "C-2". The product according to the invention is also compared with a product, identified as "C-1", which is a 140 kg/m$^3$ polyethylene foam coated with an acrylic PSA.

| PSA Foam Properties/Measured by | C-1 | C-2 | Invent. |
|---|---|---|---|
| Density (Kg/m$^3$) ASTM D1667-76 | 305 | 600 | 400 |
| Peel Adhesion (N/cm) ASTM D903 | 9 | 12 | >22 |
| Shear Adhesion (N/cm$^2$) ASTM D1002 | 80 | 80 | 110 |
| Tensile Adhesion (N/cm$^2$) ASTM D897 | 75 | 65 | 120 |
| Elongation at break (%) ISO 1926 | 210 | 220 | 185 |
| Tensile Strength (N/cm$^2$) ISO 1926 | 230 | 110 | 95 |

For the shear tests the method was modified by changing the speed from 1.3 mm/min to 10 mm/min. The samples were conditioned at room temperature for 24 hours before testing. Adhesion tests were made on stainless steel except that tensile adhesion was between aluminum T-blocks. Also in the tensile adhesion test the sample was 25.4 mm×25.4 mm square and the speed of testing was 300 mm/min. No dwell time was provided. Measurement of all the above parameters was carried out on a tensile Instron Type 1122 machine.

| Adhesion..Diff. Substrates (N/cm) | C-1 | C-2 | Invent. |
|---|---|---|---|
| Stainless Steel | 9 | 12 | >22 |
| Glass | — | 14 | >22 |
| Polypropylene | — | 3 | 12 |

| Adhesion after aging (N/cm) | C-2 | Invent. |
|---|---|---|
| after 10 min. @ RT | 11 | 36 |
| after 24 hr. @ RT | 21 | >48 |
| after 24 hr @ RT  + 5 hr @ −30° C. | 15 | >10 * |
| + 7 days @ 70° C. | 25 | >44 |
| + 3 days in warm moisture | 22 | 32 |
| after waxing compd. aging | 15 | 24 |
| after dewaxing compd. aging | 18 | >50 |
| after washing solution aging | 16 | 20 |
| after alcohol aging | 15 | >27 |

* indicates that the foam tore apart

Example 2

This example is a comparison of the compression set of a foam that is chemically blown (by an excess of isocyanate and its reaction with moisture) and a foam that is made using expandable particulate (Expancel®).

Samples 3, 4 and 5 are made using the same process as is described in Example 1. Samples 1 and 2 were also made according to the process of Example 1 except for the omission of the polyetherdiol. The diisocyanate is mixed with the masterbatch in the Brabender. The film made under the press is put at 70° C., 100% humidity for 24 hours, for foaming and reticulation.

Sample 3 is the product according to the invention described in Example 1.

| Ingredient | | | | | | |
|---|---|---|---|---|---|---|
| Nature | Name | 1 | 2 | 3 | 4 | 5 |
| SBS Rubber | Vector 4111 | 100 | 100 | 100 | 100 | 100 |
| Tackifying Resin | Regalite R101 | 200 | 200 | 200 | 200 | 200 |
| CaCO$_3$ | Setacarb OG | 9 | 9 | 9 | 9 | 9 |
| Paraffinic Oil | Enerpar 10 | 30 | 30 | 30 | 30 | 30 |
| Polyetherdiol | Lupranol 2001 | — | — | 75 | 75 | 75 |
| Catalyst | Dabco T12 | 0.6 | 0.6 | — | — | — |
| Catalyst | Texacat T30 | — | — | 5 | 5 | 5 |
| Diisocyanate | LupranatMP130 | 80 | 40 | — | — | — |
| Diisocyanate | Vestanat TMDI | — | — | 8 | 8 | 8 |
| Plastic spheres | ExpancelDU091 | — | — | 33 | — | — |
| Glass spheres | Armospheres 150 um | — | — | — | 8 | — |

The compression set was determined using ASTM Standard Test Method D 1667-76, paragraphs 21 to 25. The following modification, however, was made to the test method. Instead of the test specimen being deflected 25% of its original thickness, the specimen is deflected to 50% of its original thickness.

The specific gravity was measured using ASTM D1667-76 The force to compress was measured using ASTM D1667-76, except that the samples were compressed to 30% of their thickness rather than 25% at a speed of 10 mm/min.

| Property | Units | 1 | 2 | 3 | 4 | 5 |
|---|---|---|---|---|---|---|
| Specific gravity | Kg/m$^3$ | 500 | 800 | 400 | 860 | 950 |
| % of theoretical density | % | 53 | 84 | 42 | 90 | 100 |

-continued

| Property | Units | 1 | 2 | 3 | 4 | 5 |
|---|---|---|---|---|---|---|
| Compression set | % | 61 | 35 | 11 | | 41 |
| Force to compress | N/cm² | | | 8.4 | 16.2 | 10.3 |

Example 3

A group of olefinic polymers were used to prepare foamed pressure sensitive adhesives from the following composition.

Olefinic Polymer Adhesive Formulation

| Adhesive Composition | Parts |
|---|---|
| Olefinic polymer (a) | 100 |
| Tackifier resin (b) | 200 |
| Plasticizer oil (c) | 50 |
| Expandable particles (d) | 20 |

(a) See Table below.
(b) ECR 404 resin, obtained from Exxon Chemical Europe, Machelen, Belgium.
(c) Enerpar 10 oil, obtained from BP Chemicals, Zwijndrecht, Belgium.
(d) Expancel 091DE80 particles, obtained from Expancel, Sundwall, Sweden.

The adhesive compositions were foamed by a method similar to the method described in Example 1, above, except that all mixing was carried out in a Brabender plasticorder mixer and the mixer was preheated to a temperature of 120±10° C., the rotation of the roller arms was set at 50 rpm, and the polymers and quantities described above were used in place of the SBS Rubber formulation of Example 1. After about two minutes of mixing, a homogeneous melt was obtained and the temperature was decreased to 90° C. and the remaining components of the adhesive formulation were mixed with the molten polymer. The expandable particles were added after the temperature of the mixture was less than 90° C. After mixing, the mixture was removed from the mixer and was laminated in a preheated press at 100° C. between two sheets of siliconized PET to the thickness needed to yield the final adhesive product after foaming. Foaming was conducted by placing the preformed sheet into an oven preheated to a temperature sufficient to expand the Expancel particles, i.e., 150° C. for 15 minutes.

Peel adhesion from stainless steel and from polypropylene and compression set were measured by the methods described in Examples 1 and 2, above. Results are shown below, along with hand tack observations and the density and torsion modulus of the olefinic polymers.

| olefinic polymer | polymer density g/cm3 | torsion modulus MPa | hand tack | peel adhesion steel | peel adhesion polyprop | compression set % |
|---|---|---|---|---|---|---|
| C-3 | 0.900 | 18 | none | <1 | <1 | * |
| C-4 | 0.912 | 12 | none | <1 | <1 | * |
| 6 | 0.917 | 34 | none | <1 | <1 | * |
| 7 | 0.896 | 4.4 | low | <1 | <1 | * |
| 8 | 0.875 | 3.7 | low | <1 | <1 | * |
| 9 | 0.870 | 1.9 | high | >16 | 6 | 7.7 |
| 10 | 0.868 | 1.15 | high | 15 | 6 | 2.4 |

-continued

| olefinic polymer | polymer density g/cm3 | torsion modulus MPa | hand tack | peel adhesion steel | peel adhesion polyprop | compression set % |
|---|---|---|---|---|---|---|

* The foam made from these samples was not usable and samples were not tested for compression set.

Samples 6 (Exceed™ 350A60, a metallocene: ethylene/hexene copolymer, m.p.=119° C.), 7 (Exact™ 4015, a metallocene: ethylene/butene copolymer. m.p.=83° C.), 10 (Exact 5008, a metallocene: ethylene/butene copolymer), and C-4 (Escorene™ 655 low density polyethylene) olefinic resins were obtained from Exxon Chemical Company. Samples 9 (Engage™ EP 8500, a metallocene: ethylene/octene copolymer, m.p.=56° C.) and 8 (Engage™ KC 8852, a metallocene: ethylene/octene copolymer) olefinic resins were obtained from Dow Chemical Company, and sample C-3 (DFDB 9042 NT-linear low density ethylene copolymer) resin was obtained from Union Carbide Corporation.

Torsion Modulus Measurements

Polymer torsion modulus was measured by die cutting a 10 mm in diameter sample from a sheet of polymer which had been hot pressed at 120 C to yield a 1 mm thick sheet. The sample was tested in a Stresstech rheometer (a universal controlled stress rheometer) by placing a sample between two parallel plates (5 mm in radius)(r), applying a normal force of 10 N to the upper plate and measuring the gap (h) between the plates. The gap was recorded to an accuracy of $\frac{1}{1000}$ mm. A sinusoidal stress was then applied to the upper plate at a frequency equal to 1 Hz and an amplitude equal to 10.000 Pa, and the sinusoidal deformation was recorded. The strain ($\gamma$) is calculated from the angle amplitude $\theta$ using the equation: $\gamma=(\theta \times r)/h$. The torsion complex modulus $G^*$ is calculated by dividing the stress (i.e., 10.000 Pa) by the strain.

Suitable adhesive properties and foam compression set characteristics were obtained using olefinic polymer samples having a density less than 0.910 g/cm3 and a torsion modulus of less than 18 MPa.

Example 4

Additional pressure sensitive adhesive foam compositions were prepared using different tackifying resins and plasticizing oils with the Engage 8500 (sample 9) and Exact 5800 (sample 10) resins to yield a series of samples having calculated theoretical densities of 960±20 Kg/m3, and foam densities of 341-465 Kg/m3 (by ASTM D1667-76 method). The foam densities represent 35 to 50% of the theoretical densities of the adhesive formulations.

Peel strengths from stainless steel and from polypropylene were conducted on all samples by the methods described in Examples 1 and 2, and the results are given below. Compression set tests were conducted by the method described in paragraphs 21–25 of ASTM D1667-76 with a 25% deflection.

| | Parts by Weight | | | | | | |
|---|---|---|---|---|---|---|---|
| Sample No. | 9a | 9b | 9c | 10a | 10b | 10c | 10d |
| Component | | | | | | | |
| Olefinic Polymer | | | | | | | |
| Sample 9 | 100 | 100 | 100 | | | | |
| Sample 10 | | | | 100 | 100 | 100 | 100 |
| ECR 404 Tackifier | 200 | | | 200 | 200 | | |
| Escorez 1304 Tackifier | | 200 | | | | 200 | |
| Piccotac 95 Tackifier | | | 200 | | | | 200 |
| Enerpar 10 Oil | 50 | 50 | 50 | 50 | | 50 | 50 |
| Hyvis 10 Oil | | | | | 50 | | |
| Expancel Particles | 20 | 20 | 20 | 20 | 20 | 20 | 20 |
| Test Results | | | | | | | |
| Foam Density Kg/m3 | 383 | 407 | 367 | 390 | 426 | 380 | 407 |
| Peel St. Steel N/cm | >16 | 0 | >37 | 15 | >31 | >24 | >20 |
| Peel Polypropylene N/cm | 8 | >33 | >33 | 6 | >28 | >24 | >20 |
| Compression set % | 7.7 | 21 | 8 | 2.4 | 26 | 13 | 16.2 |

Results demonstrate the superior adhesion to plastic surfaces, such as polypropylene, of the foams of the invention in comparison the the acrylic adhesive coated foams of the prior art (see Example 2 peel tests results for C-2 sample). Formulations containing certain combinations of the olefinic polymer samples 9 and 10 with some tackifying resins, and/or plasticizing oil showed superior adhesion results and would be used where pressure sensitive foams having higher peel adhesion strength are needed. Best results were obtained with sample 9c (Engage 8500) ethylene/octene copolymer in combination with Piccatoc 95 tackifier and Hyvis 10 oil.

Additional samples having foam densities of 223–843 Kg/m3 were prepared from sample 10 resin using the adhesive formulations shown below. Glass microspheres were used in place of the Expancel particles in some of these samples.

| Formulations Containing Glass Spheres | | | | | |
|---|---|---|---|---|---|
| Sample No.: | 10e | 10f | 10g | 10h | 10i |
| Component | | | | | |
| Olefin (a) | 100 | 100 | 100 | 100 | 100 |
| Tackifying resin (b) | 200 | 200 | 200 | 200 | 200 |
| Plasticizing Oil (c) | 50 | 50 | 50 | 50 | 50 |
| Expancel Particles | 5 | 20 | 50 | 0 | 0 |
| Glass Spheres (d) | 0 | 0 | 0 | 20 | 50 |
| Test Results | | | | | |
| Foam Density | 674 | 390 | 223 | 843 | 824 |
| Peel Stainless Steel | >17 | 15 | 7 | >28 | 17 |
| Compression N/cm2 | 18 | 14 | 13 | 26 | 28 |

(a) Exact 5800 resin (sample 10).
(b) ECR 404 resin.
(c) Enerpar 10 oil.
(d) Armospheres 150 particles (hollow glass micro balloons, average particle size 75 microns, and specific gravity 0.60–0.75 g/cc) obtained from PQ Hollow Spheres Ltd., Yorkshire, England.

In samples containing the glass spheres, the concentration of spheres affected the peel strength of the foam, yielding higher peel values at lower concentrations. The expandable particles yielded a soft foam, having a range of densities depending upon the concentration of particles contained in the foam sample. All samples yielded acceptable pressure sensitive adhesive foams.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A pressure sensitive adhesive foam, wherein the foam has a peel adhesion of greater than about 1 N/cm, comprising:
   a) at least one olefinic polymer, having a density less than 0.91 g/cm$^3$ and a torsion modulus less than 19 MPa;
   b) at least one tackifying resin; and
   c) at least one particulate material, selected from the group consisting of expandable particulate material comprising a polymeric shell and a volatilizable fluid core; and glass spheres.

2. The pressure sensitive adhesive foam of claim 1, comprising from about 99.5 to about 65% by weight of a pressure sensitive adhesive polymer composition having a peel adhesion greater than about 10 N/cm and from about 0.5 to about 35% by weight of an expandable particulate material comprising a polymeric shell and a volatilizable fluid core.

3. A pressure sensitive adhesive foam according to claim 1, having a density of less than about 70% of the theoretical density, wherein the foam has a peel adhesion of greater than about 20 N/cm and a compression set of less than about 60% and wherein the foam comprises:
   a) from about 5 to about 80% by weight of at least one olefinic polymer having a density less than 0.91 g/cm3 and a torsion modulus of less than 18 MPa;
   b) from about 15 to about 80% by weight of at least one tackifying resin;
   c) from about 0.5 to about 30% by weight of at least one plasticizing oil; and
   d) from about 2 to about 25% by weight of expandable particulate materials comprising a polymeric shell and a volatilizable liquid core.

4. A pressure sensitive adhesive foam according to claim 1 in which the olefinic polymer is selected from the group consisting of polyethylene, polypropylene, polybutene and poly-methylpentene, and copolymers thereof, and mixtures thereof.

5. A pressure sensitive adhesive foam according to claim 1 in which the tackifying resin is selected from the group consisting of rosins and rosin derivatives, hydrocarbon resins and terpene resins.

6. A pressure sensitive adhesive foam according to claim 5 in which the tackifying resin is a hydrocarbon resin selected from the group consisting of glycerine rosin ester, hydrogenated pentaerythritol ester, hydrogenated glycerine ester, modified tall oil rosin, polymerized rosin and rosin ester.

7. A pressure sensitive adhesive foam according to claim 4 in which the olefinic polymer is selected from the group consisting of polyethylene, copolymers of ethylene and mixtures thereof.

8. A pressure sensitive adhesive foam according to claim 7 in which the copolymers are polymerized using monomers selected from the group consisting of butene, hexene, octene and methylpentane.

9. A pressure sensitive adhesive foam according to claim 7 in which the monomers are alpha-olefins.

10. A pressure sensitive adhesive foam according to claim 1, having a density of less than about 40% of the theoretical density, wherein the foam has a peel adhesion of greater than about 20 N/cm and a compression set of less than about 20% and wherein the foam comprises:
   a) from about 10 to about 50% by weight of at least one olefinic polymer having a density less than 0.91 g/cm3 and a torsion modulus of less than 18 MPa;
   b) from about 25 to about 70% by weight of at least one tackifying resin;
   c) from about 2 to about 20% by weight of at least one plasticizing oil; and
   d) from about 2 to about 25% by weight of expandable particulate materials comprising a polymeric shell and a volatilizable liquid core.

11. A pressure sensitive adhesive foam according to claim 1, having a density of less than about 40% of the theoretical density, wherein the foam has a peel adhesion of greater than about 20 N/cm and a compression set of less than about 20% and wherein the foam comprises:
   a) from about 20 to 35% by weight of at least one olefinic polymer having a density less than 0.91 g/cm3 and a torsion modulus of less than 18 MPa;
   b) from about 30 to about 60% by weight of at least one tackifying resin;
   c) from about 5 to about 15% by weight of at least one plasticizing oil; and
   d) from about 2 to about 25% by weight of expandable particulate materials comprising a polymeric shell and a volatilizable liquid core.

12. A pressure sensitive adhesive foam having a peel adhesion greater than about 10 N/cm, comprising from about 99.5 to about 70% by weight of a pressure sensitive adhesive polymer composition and from about 0.5 to about 30% by weight of an particulate material comprising glass spheres, wherein
   the pressure sensitive adhesive polymer composition comprises at least one olefinic polymer, having a density of less than 0.910 g/cm3 and a torsion modulus of less than 18 MPa, and at least one tackifying resin.

13. A pressure sensitive adhesive foam according to claim 12, comprising:
   a) from about 5 to about 80% by weight of at least one olefinic polymer selected from the group consisting of polyethylene, polyproplyene, polybutene and polymethyl-pentene, and copolymers thereof, and mixtures thereof;
   b) at least one tackifying resin in an amount sufficient to give the adhesive foam a peel adhesion of at least 10 N/cm; and
   c) from about 0.5 to about 30% by weight of glass spheres.

14. A pressure sensitive adhesive foam according to claim 12, comprising:
   a) from about 10 to about 50% by weight of at least one olefinic polymer;
   b) from about 15 to 80% by weight of at least one tackifying resin;
   c) from about 0.5 to 15% by weight of at least one plasticizing oil; and
   d) from about 2 to about 20% by weight of glass spheres.

15. A pressure sensitive adhesive foam according to claim 12, comprising:
   a) from about 20 to about 35% by weight of at least one olefinic polymer;
   b) from about 30 to 60% by weight of at least one tackifying resin;
   c) from about 2 to 20% by weight of at least one plasticizing oil; and
   d) from about 5 to about 15% by weight of glass spheres.

16. A method for joining at least one plastic surface to a substrate, comprising the steps:
   a) bringing the pressure sensitive adhesive foam of claim 1 into contact with a plastic surface;
   b) applying pressure to form a laminate of the pressure sensitive adhesive foam and the plastic surface;
   c) bringing a portion of the laminate consisting of the pressure sensitive adhesive foam into contact with the substrate; and
   d) applying pressure to form an assembly comprising the plastic surface, the pressure sensitive adhesive and the substrate, whereby a force of at least 5 N/cm must be applied to separate the pressure sensitive adhesive foam from the plastic surface in the laminate.

17. The method of claim 16, wherein the plastic surface is a decorative trim piece comprising polypropylene and the substrate is a vehicle body.

18. A method for joining at least one plastic surface to a substrate, comprising the steps:
   a) bringing the pressure sensitive adhesive foam of claim 12 into contact with a plastic surface;
   b) applying pressure to form a laminate of the pressure sensitive adhesive foam and the plastic surface;
   c) bringing a portion of the laminate consisting of the pressure sensitive adhesive foam into contact with the substrate; and
   d) applying pressure to form an assembly comprising the plastic surface, the pressure sensitive adhesive and the substrate, whereby a force of at least 5 N/cm must be applied to separate the pressure sensitive adhesive foam from the plastic surface in the laminate.

19. The method of claim 18, wherein the plastic surface is a decorative trim piece comprising polypropylene and the substrate is a vehicle body.

* * * * *